United States Patent
Finger et al.

(10) Patent No.: US 11,304,046 B2
(45) Date of Patent: Apr. 12, 2022

(54) MOBILE DEVICE EMERGENCY SERVICES ADDRESS MANAGEMENT SYSTEM

(71) Applicant: T-Mobile USA, Inc., Bellevue, WA (US)

(72) Inventors: Joshua Finger, Covington, WA (US); Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/709,706

(22) Filed: Dec. 10, 2019

(65) Prior Publication Data

US 2021/0176618 A1    Jun. 10, 2021

(51) Int. Cl.
| | | |
|---|---|---|
| *H04W 4/90* | (2018.01) | |
| *H04W 76/50* | (2018.01) | |
| *H04W 4/029* | (2018.01) | |
| *H04W 76/11* | (2018.01) | |

(52) U.S. Cl.
CPC ............ *H04W 4/90* (2018.02); *H04W 4/029* (2018.02); *H04W 76/11* (2018.02); *H04W 76/50* (2018.02)

(58) Field of Classification Search
CPC ....... H04W 4/02; H04W 4/025; H04W 4/029; H04W 4/433; H04W 4/90; H04W 8/26; H04W 64/00; H04W 48/00; H04W 48/04; H04W 76/50; H04W 40/00; H04M 3/5116; H04M 2242/04; H04M 7/006; H04M 1/72536; H04M 1/72572; H04M 11/04; H04M 3/42348
See application file for complete search history.

(56) References Cited

U.S. PATENT DOCUMENTS

| | | | | |
|---|---|---|---|---|
| 7,433,673 B1 * | 10/2008 | Everson | .................. | H04W 4/02 455/404.1 |
| 7,734,021 B1 * | 6/2010 | Croak | .................. | H04M 7/006 379/45 |
| 8,340,711 B1 * | 12/2012 | Glass | ...................... | H04W 8/18 455/552.1 |
| 8,885,635 B2 * | 11/2014 | Linkola | ................. | H04W 48/16 370/352 |

(Continued)

*Primary Examiner* — Jean A Gelin
(74) *Attorney, Agent, or Firm* — Knobbe Martens Olson & Bear LLP

(57) ABSTRACT

Systems and methods are described for implementing an emergency services address management system for mobile devices. A mobile device may implement "voice over Wi-Fi" or otherwise communicate via wireless networks that do not provide address or location data. An emergency services address management system may associate E911 addresses with individual access points of the wireless networks, and may provide the associated E911 address instead of a default E911 address (which may be a home or billing address that is relatively distant from the user's current location) when a user of the mobile device makes a voice call to an emergency service. The system may identify access points for which an E911 address is not known, and may obtain or generate an E911 address using information from various sources, including the user, satellite-based or cellular-based location services, or other mobile devices that have accessed the wireless network via the access point.

20 Claims, 8 Drawing Sheets

(56) References Cited

U.S. PATENT DOCUMENTS

| | | | | |
|---|---|---|---|---|
| 8,890,685 | B1* | 11/2014 | Sookman | G08B 25/008 |
| | | | | 340/539.13 |
| 9,936,364 | B2* | 4/2018 | De Leo | H04W 4/029 |
| 10,111,077 | B1* | 10/2018 | Bitra | H04W 40/005 |
| 10,805,982 | B1* | 10/2020 | Buckley | H04W 12/06 |
| 2005/0171805 | A1* | 8/2005 | Casey | G06Q 10/06 |
| | | | | 705/26.1 |
| 2007/0195818 | A1* | 8/2007 | Stephenson | H04W 28/20 |
| | | | | 370/468 |
| 2013/0065550 | A1* | 3/2013 | Green | H04W 76/50 |
| | | | | 455/404.2 |
| 2013/0244609 | A1* | 9/2013 | Velusamy | H04W 4/90 |
| | | | | 455/404.1 |
| 2015/0038107 | A1* | 2/2015 | Messerly | G08G 1/205 |
| | | | | 455/404.2 |
| 2015/0156321 | A1* | 6/2015 | Abnett | H04M 3/42323 |
| | | | | 379/45 |
| 2015/0382140 | A1* | 12/2015 | Cho | G01S 5/0231 |
| | | | | 455/457 |
| 2016/0088455 | A1* | 3/2016 | Bozik | H04L 12/1895 |
| | | | | 370/225 |
| 2016/0278132 | A1* | 9/2016 | Baek | H04W 76/50 |
| 2016/0309026 | A1* | 10/2016 | Sterman | H04M 3/42059 |
| 2017/0325056 | A1* | 11/2017 | Mehta | H04M 11/04 |
| 2017/0364069 | A1* | 12/2017 | Colella | A61B 5/0022 |
| 2018/0033289 | A1* | 2/2018 | Lee | G08B 13/19 |
| 2018/0137723 | A1* | 5/2018 | Lin | G08B 25/14 |
| 2018/0310159 | A1* | 10/2018 | Katz | H04W 4/50 |
| 2019/0158991 | A1* | 5/2019 | Woodford | H04W 4/90 |
| 2020/0005642 | A1* | 1/2020 | Kim | G08G 1/0965 |
| 2020/0359173 | A1* | 11/2020 | Narra | H04W 4/027 |

* cited by examiner

MOBILE DEVICE EMERGENCY SERVICES ADDRESS MANAGEMENT SYSTEM

BACKGROUND

Generally described, mobile devices may communicate with other devices and services via wireless networks. A mobile device may, for example, enable voice communications with other mobile and landline devices by using a wireless network to connect to the public switched telephone network ("PSTN"). Mobile devices may communicate with other devices via a number of wireless networks, including cellular telecommunications networks (using protocols such as LTE, UMTS, GSM, CDMA, and the like) and other wireless networks (using protocols such as Wi-Fi, Bluetooth, UWB, and the like).

Mobile devices may further provide access to public safety answering points ("PSAPs") and other emergency services. For example, mobile devices in regions covered by the North American Numbering Plan may dial 911 to connect to an emergency operator, who may dispatch emergency services to the caller's location. Devices that connect to emergency services via the PSTN are typically associated with a street address, referred to herein as an "emergency services address" or "E911 address." The E911 address of a landline device is typically a fixed street address that is stored in a database managed by a landline network operator, and is provided to the emergency operator when the landline device is used to call emergency services.

When a mobile device connects to emergency services via a cellular telecommunications network, the cellular telecommunications network operator generates an E911 address for a mobile device based on the geographic locations of the base stations that are serving the mobile device at the time of the 911 call, or based on signals received by the mobile device from a satellite-based geolocation service. When a mobile device connects to emergency services via other wireless networks, a default street address is provided to the emergency operator. The default street address is typically the home address or billing address associated with the mobile device.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
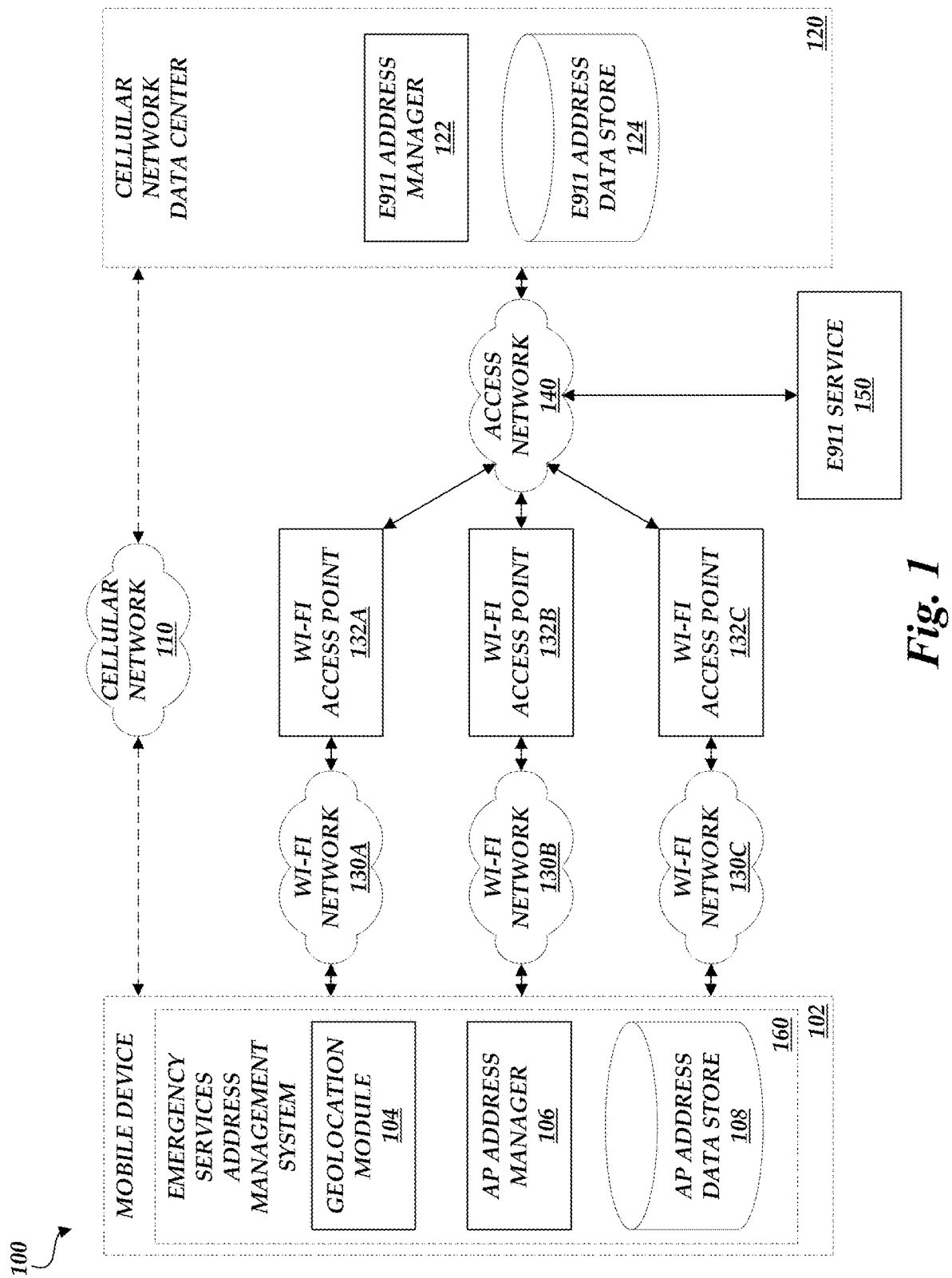
FIG. 1 is a functional block diagram of an example network environment for implementing an emergency services address management system in accordance with aspects of the present disclosure.

Generally described, aspects of the present disclosure relate to wireless telecommunications. More specifically, aspects of the present disclosure are directed to systems, methods, and computer-readable media related to an emergency services address management system. An emergency services address management system may be used to provide a current and accurate geographic address for a mobile device when the device connects to an emergency operator (e.g., when a user dials 911) via a wireless network that does not typically provide information regarding the locations of devices using the network. As an illustrative example, a mobile device may be operable to make voice calls via a cellular telecommunications network operated by a cellular service provider. The cellular telecommunications network may include functionality that allows the cellular service provider to determine a location of the mobile device. For example, the cellular network may be able to determine an approximate location of the mobile device based on measurements taken from various cellular base stations, such as the strength of radio signals received from the mobile device, the elapsed time for radio signals to travel to and from the mobile device, and the like. In some embodiments, the mobile device may be operable to partially or fully determine its own location by processing radio signals received from satellites, such as signals received from satellites in the Global Positioning System ("GPS").

The mobile device may further be operable to make voice calls via third-party networks. For example, the mobile device may implement "voice over Wi-Fi" or other functionality that connects the mobile device to the PSTN via a third-party network. In some embodiments, if a third-party network and the cellular network are both available, the mobile device may prefer to use the third-party network for non-emergency calls, but prefer to use the cellular network for emergency calls. In other embodiments, however, the third-party network may provide coverage in areas not served by the cellular network. As such, the mobile device may, under these circumstances, connect to emergency services via a network that does not provide any information regarding the mobile device's current location.

When a public safety answering point receives an emergency call from a mobile device, the PSAP queries the cellular service provider associated with the device to obtain an E911 address. If the mobile device is calling via the cellular service provider's network, then the cellular service provider may be able to determine the current location of the mobile device, and may provide that location as the device's E911 address. If the mobile device connects to emergency services via Wi-Fi or another third-party network, however, it typically indicates that the mobile device cannot connect via the cellular network and cannot be located by the cellular network. Under these circumstances, the cellular service provider typically provides a "default" E911 address for the mobile device, which is generally the home address or billing address on file. This address may be accurate if the 911 caller happens to be calling from their home or billing address. More typically, however, providing the default E911 address may cause the emergency operator to dispatch emergency services to an address that is not the location of the emergency.

To address this problem and provide a more accurate address to the emergency services operator, the cellular service provider may implement an emergency services address management system as described herein. In various embodiments, the emergency services address management system may obtain or determine street addresses for individual wireless network access points, and may dynamically update the stored E911 address for a mobile device as the device enters and leaves various third-party networks. The emergency services address management system may thus provide more accurate information regarding the location of an emergency and enable more timely and accurate dispatch of emergency services. In various embodiments, the emergency services address management system may be implemented on computing devices of the cellular service provider, mobile devices that connect to the cellular service provider's network, or combinations thereof.

While the example embodiments disclosed herein are with reference to emergency services and Wi-Fi networks, it will be understood that the present disclosure includes within its scope any service that may obtain a current street address of a mobile device when the device is connected via a third-party network that does not provide location services. For example, aspects of the present disclosure may be implemented for non-emergency services such as delivery services, transportation services (e.g., taxi and limousine dispatchers), services that connect the calling party to the nearest franchise of a business, and the like. Similarly, it will be understood that the present disclosure is not limited to emergency services that are accessed by dialing 911. For example, aspects of the present disclosure may be implemented for crisis hotlines, poison control centers, and the like.

The terms "emergency services operator," "emergency operator," "911 operator," and the like are used interchangeably herein to refer to an operator or dispatcher of emergency services, and in some contexts to the service as a whole or the provider of the service. The terms "emergency service" and "public safety answering point" are similarly used, as are "E911 address" and "emergency services address." It will also be understood that, although the example embodiments disclosed herein are with reference to voice calls over Wi-Fi networks, the present disclosure is not limited to any particular type of communication, network, or networking protocol.

It will be understood that the emergency services address management system described herein addresses a technical problem that specifically arises in the realm of computer networks, and in particular addresses a problem that arises in the realm of wireless telecommunications. It will further be understood that the technical problem described herein is not analogous to any pre-Internet practice, and that the emergency services address management system improves the performance of a cellular telecommunications network by allowing it to provide more accurate geolocation information to emergency services. The cellular network service provider may thus offer an improved service by implementing aspects of the present disclosure.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the disclosures herein described.

FIG. 1 is a block diagram of an example network environment 100 for implementing an emergency services address management system 160 in accordance with aspects of the present disclosure. The network environment 100 may include a mobile device 102, which may communicate with a cellular network data center 120 via a number of different networks. The mobile device 102 may, for example, communicate with the cellular network data center 120 via a cellular network 110, which may illustratively include a Long Term Evolution (LTE) network, Universal Mobile Telecommunication System (UMTS) network, Global System for Mobile Communications (GSM) network, Code Division Multiple Access (CDMA) network, or other type of cellular telecommunications network. The cellular network 110 may generally be any network that enables locating the mobile device 102.

The mobile device 102 may include a geolocation module 104, access point address manager 106, and access point address data store 108, which may implement aspects of the present disclosure as described in more detail below. The mobile device 102 may also, at various times, communicate with the cellular network data center 120 via one or more Wi-Fi networks 130A-C. The Wi-Fi networks 130A-C may respectively include Wi-Fi access points 132A-C, which facilitate joining the Wi-Fi networks 130A-C and connect the Wi-Fi networks 130A-C to an access network 140. The access network 140 may illustratively be any wired or wireless network, or combination thereof. In addition, the access network 140 may include, but is not limited to, a cellular telecommunications network (including, e.g., the cellular network 110), Wi-Fi network, cable network, satellite network, mesh network, personal area network, local area network (LAN), wide area network (WAN), public or private intranet, the Internet, or other public or private communications network or networks, or any combination thereof. In some embodiments, the access network 140 may be a private or semi-private network, such as a corporate or university intranet. The access network 140 may use protocols and components for communicating via the Internet or any of the other aforementioned types of networks. In some embodiments, the access network 140 may be omitted, and one or more of the Wi-Fi access points 132A-C may communicate directly with the cellular network data center 120.

In some embodiments, the cellular network data center 120 may implement all or part of the functionality of the emergency services address management system 160. For example, the cellular network data center 120 may maintain a central data store of access point addresses, instead of or in addition to individual mobile devices 102 maintaining respective access point address data stores 108. The cellular network data center 120 may further include an E911 address manager 122, which may implement aspects of the present disclosure as described in more detail below, and an E911 address data store 124, which may store the E911 address that is currently associated with the mobile device 102. The access point address data store 108 and the E911 address data store 124 may illustratively be any non-transitory computer-readable data store, including but not limited to solid state devices, hard drives, tape drives, magnetic media, flash memory, and the like.

The mobile device 102 and the cellular network data center 120 may communicate with an E911 service 150 via the access network 140. The E911 service 150 may be configured to facilitate, for example, voice communication with the mobile device 102 and data communication with the cellular network data center 120. In some embodiments, the E911 service 150 may be a public safety answering point (PSAP).

It will be understood that the network environment may include more (or fewer) elements than those shown in FIG. 1. It is not necessary, however, that all of these elements be shown in order to provide an enabling disclosure.

Figure 2:
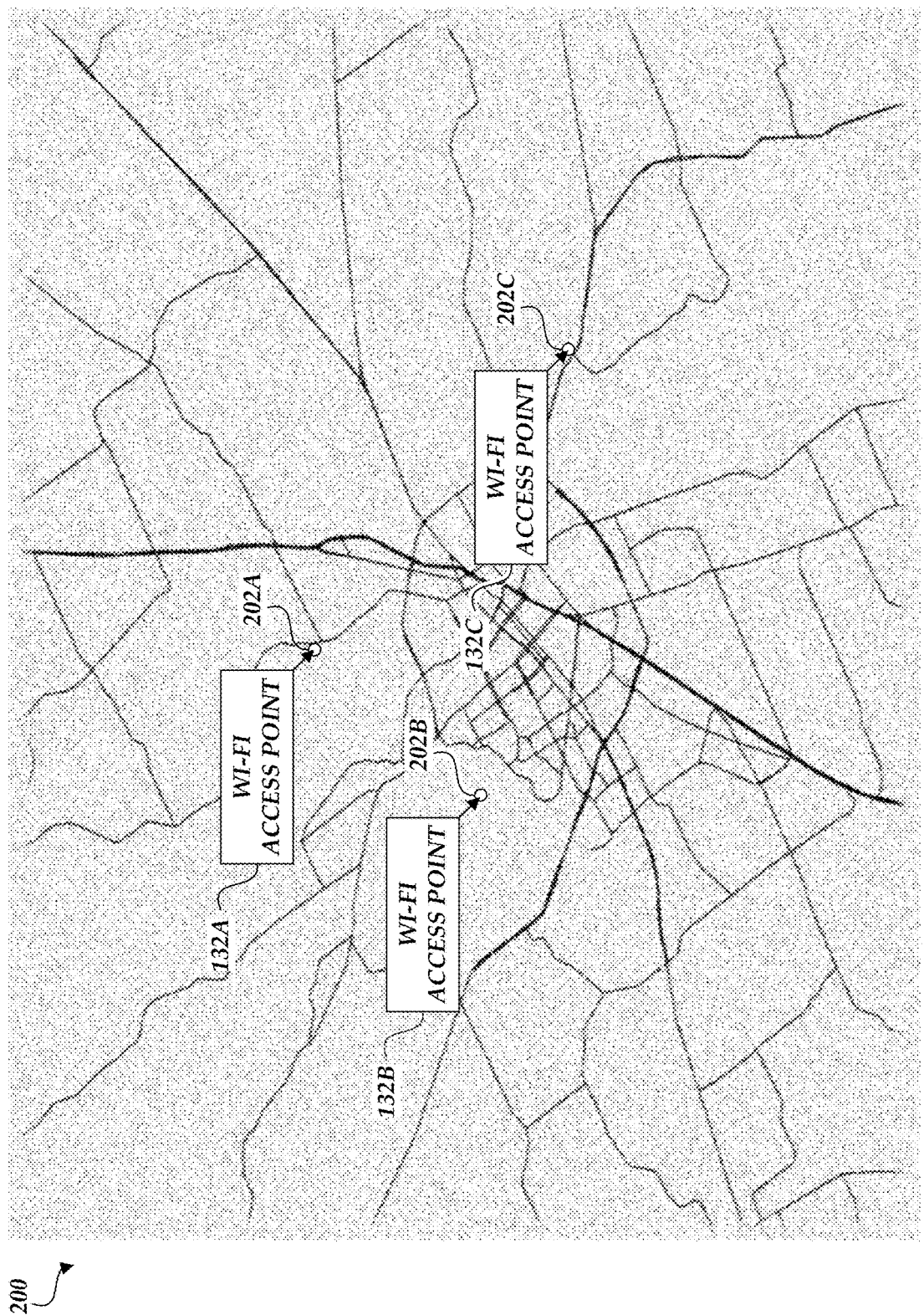
FIG. 2 is a pictorial diagram of a geographic area in which mobile devices may access wireless networks and manage emergency services addresses in accordance with aspects of the present disclosure.

FIG. 2 is a pictorial diagram of a geographic area 200 in which a mobile device, such as the mobile device 102 depicted in FIG. 1, may interact with individual Wi-Fi access points 132A-C via their respective wireless networks. In the depicted geographic area 200, each of the Wi-Fi access points 132A-C and corresponding wireless networks may be respectively associated with a different street address 202A-C, which may be located within a coverage footprint of the associated wireless network. In some embodiments, a single Wi-Fi network may be associated with more than one access point 132A-C, and may span a larger geographic area than a single street address. However, each individual access point 132A-C may still be associated with a street address within the coverage area of the Wi-Fi network. In further embodiments (not depicted in FIG. 2), more than one access point may be associated with the same street address. For example, two access points may be located on different floors of a building.

In some embodiments, a mobile device 102 may interact with individual Wi-Fi access points 132A-C at different times. For example, location 202A may be a "home" location at which a user maintains a home Wi-Fi network, which the user may access using a mobile device 102 and access point 132A. The user may then travel from the "home" location 202A to a "work" location 202B, and may access an employer's Wi-Fi network via access point 202B. At a later time, the user may visit a "coffee shop" location 202C and access a third Wi-Fi network via access point 202C. In other embodiments, a mobile device 102 may interact with multiple Wi-Fi access points 132A-C in parallel. For example, the mobile device 102 may determine that it is receiving broadcast signals from multiple Wi-Fi access points 132A-C, and may estimate its E911 location based on, e.g., relative signal strengths, propagation delays, or other measurements or weighting factors. In some embodiments, the mobile device 102 may estimate its location based on current and historical signal strength measurements for the nearby access points.

Figure 3:
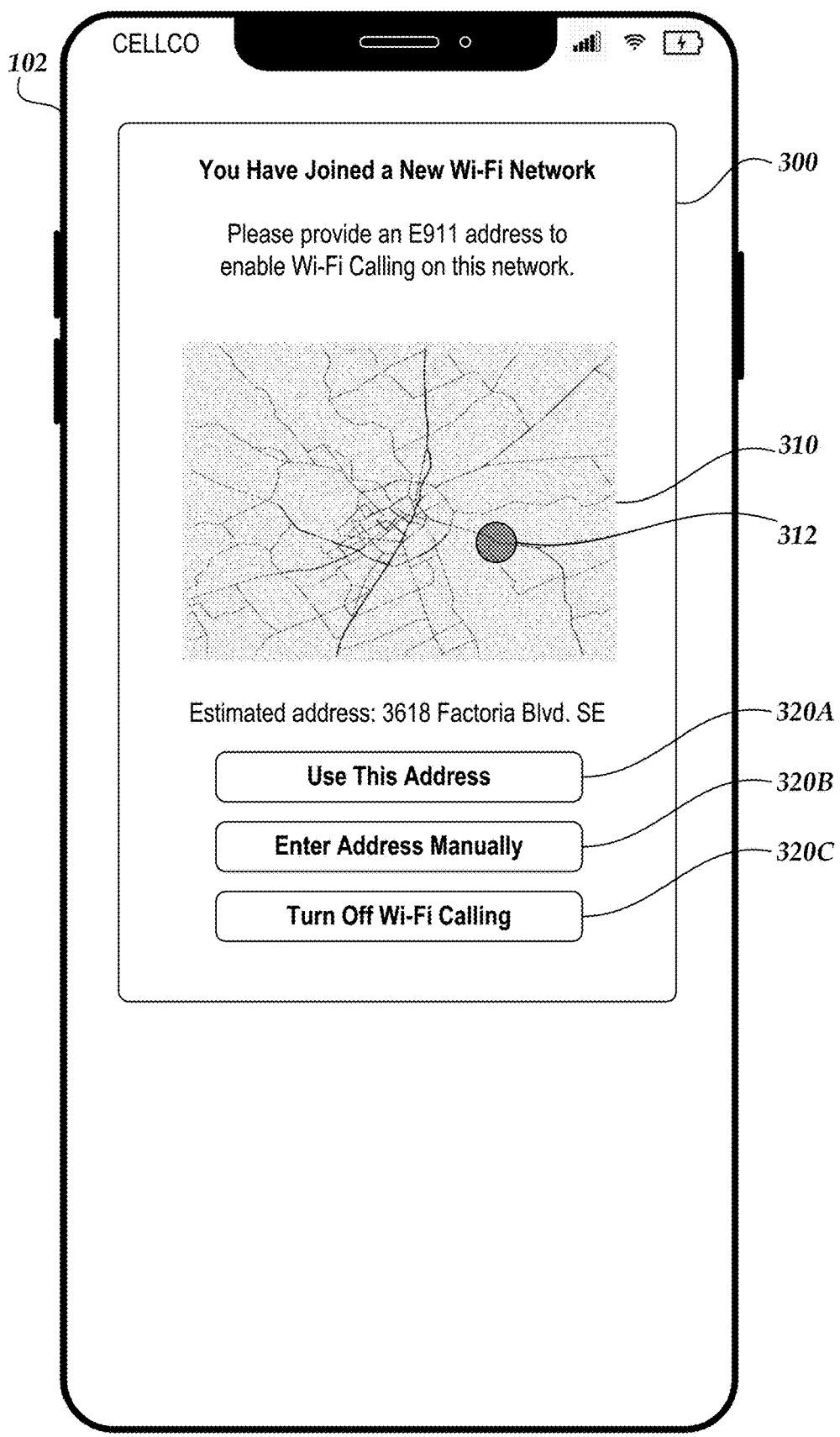
FIG. 3 is a pictorial diagram of an example user interface generated by an emergency services address management system in accordance with aspects of the present disclosure.

FIG. 3 is a pictorial diagram of an example user interface 300 generated by an emergency services address management system in accordance with aspects of the present disclosure. The user interface 300 may be displayed, for example, by the mobile device 102 (e.g., via the user interface module 724 depicted in FIG. 7). In some embodiments, all or part of the user interface 300 may be generated by a backend server (e.g., a server in the cellular network data center 120) and transmitted to the mobile device 102 for display. The user interface 300 may be displayed when the mobile device 102 joins a Wi-Fi network via an access point that is not associated with a street address, or when the mobile device 102 transitions to a different access point in a previously joined Wi-Fi network. In some embodiments, the mobile device 102 may maintain a database of Wi-Fi network access points and associated street addresses, and may query this database to determine whether a street address is available. In other embodiments, the mobile device 102 may query a central database (e.g., one maintained by a cellular network operator) for a street address associated with a specified access point. If no street address is available (e.g., because the mobile device is encountering the access point for the first time), then the mobile device 102 may display the user interface 300 to facilitate obtaining a street address for the access point. In some embodiments, the mobile device 102 may determine a street address for an access point without displaying the user interface 300.

The user interface 300 may include one or more options that enable a user to specify a user-verified street address to associate with the access point. In the illustrated embodiment, the user interface 300 includes a map display 310 and an estimated geolocation 312. The geolocation of the mobile device 102 may be obtained using a geolocation capability of the mobile device 102 (e.g., via a satellite-based geolocation service such as the Global Positioning System that is accessed via the geolocation module 104) or via a cellular telecommunications network that is operable to locate devices on that network. The geolocation may then be converted to an approximate street address, which may be displayed within the user interface 300.

The user interface 300 may further include buttons 320A-C, which may facilitate user input. Tapping the "use this address" button 320A, for example, may cause the emergency services address management system to use the determined street address as the E911 address of the access point. Tapping the "enter address manually" button 320B may cause the emergency services address management system to display a further user interface that prompts the user to enter an address manually, and tapping the "turn off Wi-Fi calling" button 320C may disable voice over Wi-Fi services while the mobile device 102 is connected via the access point. In some embodiments, the user interface 300 may include further options or other data sources for obtaining a street address. For example, the emergency services address management system may obtain a street address that other mobile devices have previously associated with the access point, or may obtain a street address from the access point itself (e.g., via a broadcast signal). In some embodiments, the emergency services address management system may use one or more data sources to determine the street address, and may present the user only with options to change the address or turn off voice over Wi-Fi. In other embodiments, geolocation services may be unavailable (e.g., because the mobile device 102 is underground), and the emergency services address management system may present only the option for the user to manually enter a street address.

In some embodiments, the emergency services address management system may present the user with options for updating the street address associated with an access point. For example, an access point may be provided by a coffee shop or other business that has recently changed its street address. The emergency services address management system may therefore detect that the current location of the mobile device 102 is not consistent with the stored E911 address for the access point, and may prompt the user to update or correct the stored address. In other embodiments, the emergency services address management system may automatically update the street address associated with an access point based on geolocation data obtained from the mobile device 102 and/or other mobile devices.

In various embodiments, the controls and other elements in the user interface 300 may be combined, separated, or modified. For example, the map display 310 and the estimated geolocation 312 may be omitted, and the determined street address may be displayed as text without being shown on a map. As a further example, the user interface 300 may include information that identifies the Wi-Fi access point, such as its Media Access Control address ("MAC address"), Internet Protocol address ("IP address"), or Service Set Identifier ("SSID"). The example user interface 300 depicted in FIG. 3 is thus understood to be illustrative and not limiting.

Figure 4A:
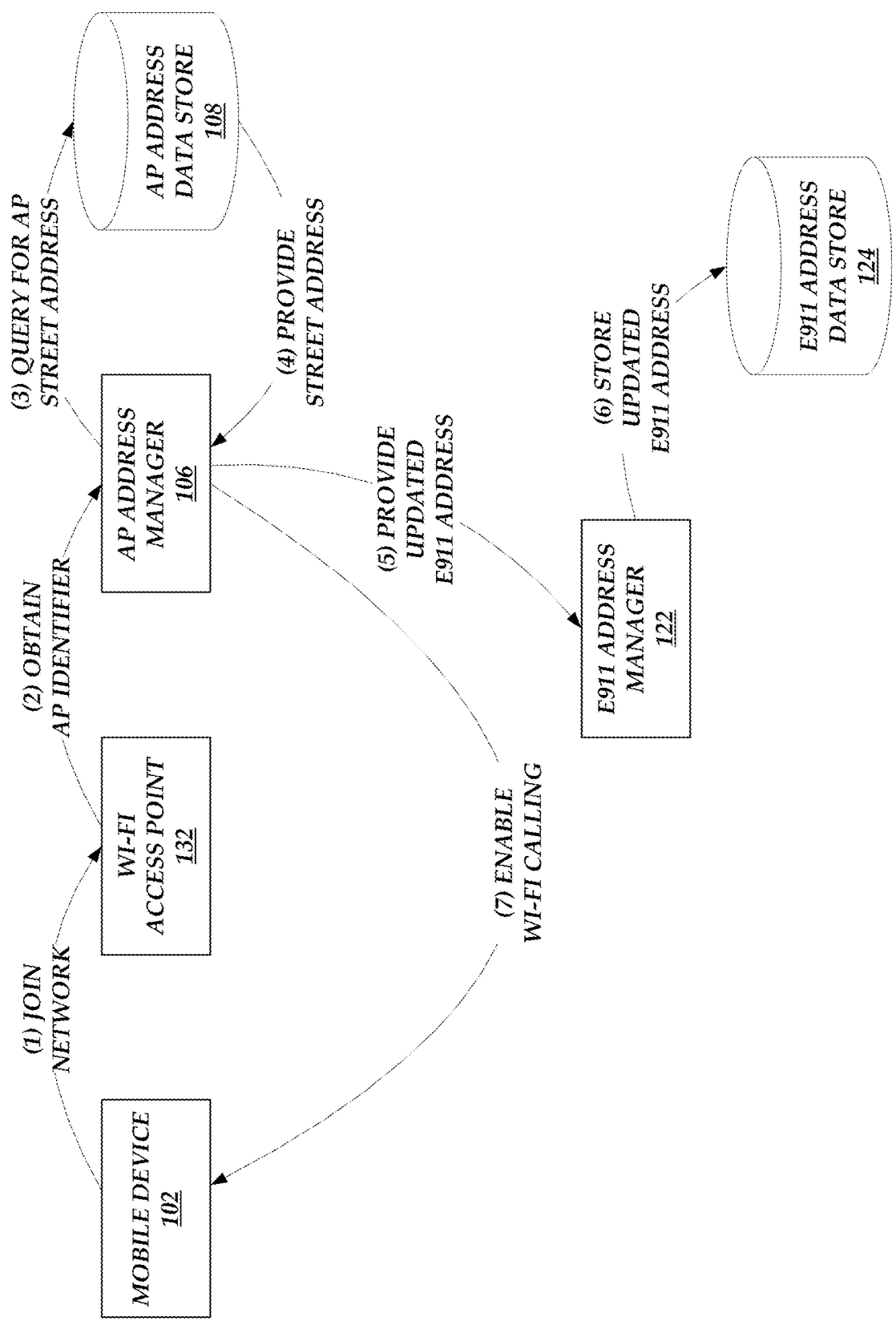
FIGS. 4A and 4B are block diagrams depicting example interactions for managing emergency services addresses in accordance with aspects of the present disclosure.
Figure 4B:
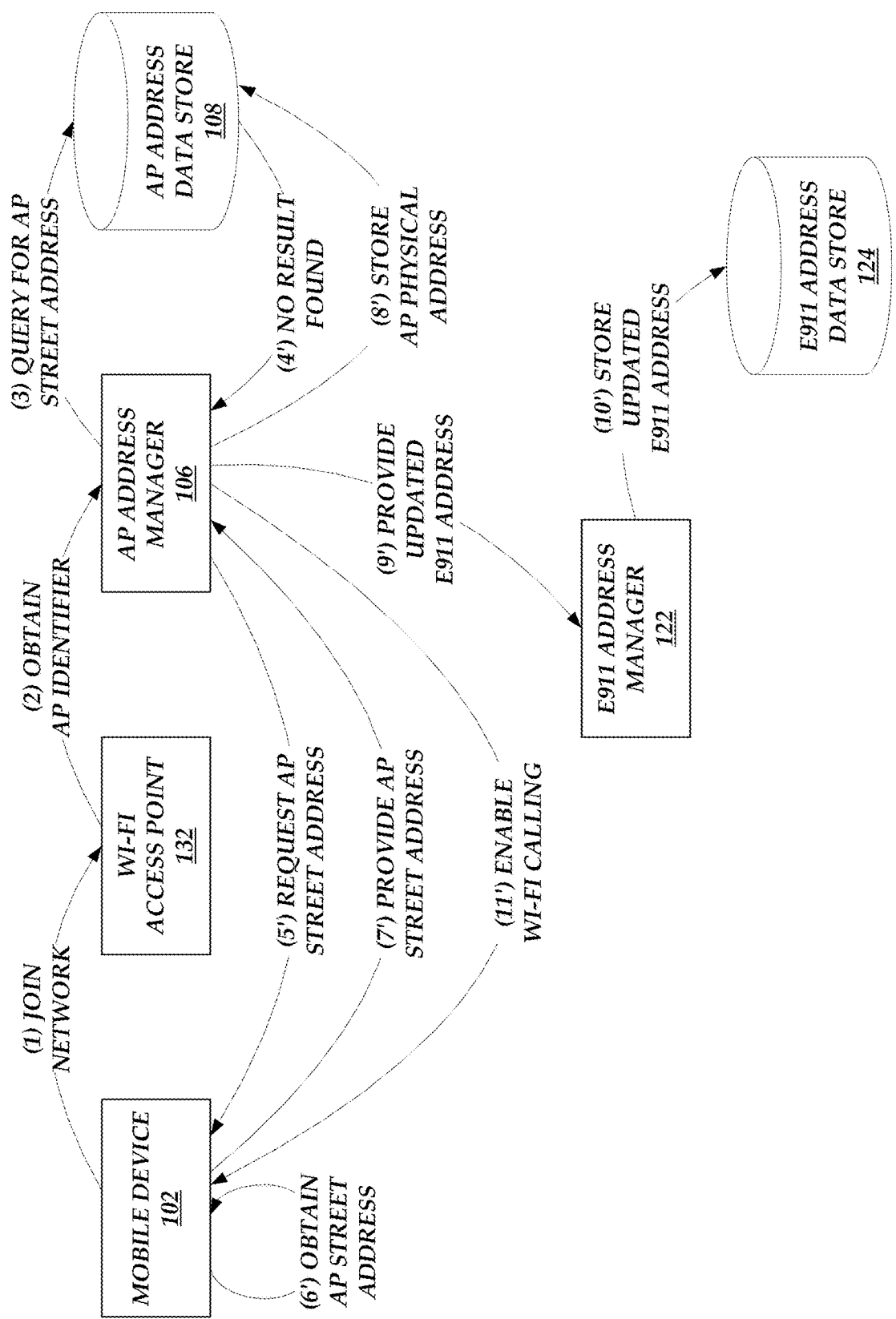

FIGS. 4A and 4B are block diagrams depicting example interactions for managing E911 addresses and enabling voice over Wi-Fi functionality in accordance with aspects of the present disclosure. In some embodiments, as described in more detail below, voice over Wi-Fi calls may only be enabled on Wi-Fi networks that can be associated with an E911 address, and may only be enabled once the E911 address has been associated. FIG. 4A depicts an embodiment in which an access point has previously been associated with a street address, and FIG. 4B depicts an embodiment in which the access point has not previously been associated with a street address. With reference now to FIG. 4A, at (1), a mobile device 102 joins a Wi-Fi network by requesting access from a Wi-Fi access point 132. In some embodiments, as described above, a Wi-Fi network may contain multiple access points, and the interaction at (1) may be the mobile device 102 connecting to a different access point within a network the mobile device 102 has already joined. At (2), an access point address manager 106 obtains an identifier from the access point 132. The identifier may illustratively be the MAC address, IP address, SSID, or other identifying information. In some embodiments, the identifier may uniquely identify the access point 132. In other embodiments, the identifier may be used with other information to uniquely identify the access point.

At (3), the access point address manager 106 queries an address data store 108 for a street address associated with the access point 132. At (4), in the illustrated embodiment, the address data store 108 returns a street address. As discussed in more detail below, the street address may have been determined previously by carrying out the interactions depicted in FIG. 4B.

At (5), the access point address manager 106 provides the street address to an E911 address manager 122 to be designated as the current and up-to-date E911 address of the mobile device 102. The E911 address manager 122 then, at (6), stores the street address in an E911 address data store 124. In some embodiments, the E911 address manager 122 and/or the E911 address data store 124 may retain the E911 address that was previously current, and may restore the previous E911 address when the mobile device leaves the Wi-Fi network. At (7), in some embodiments, the access point address manager 106 enables voice over Wi-Fi calling on the mobile device 102. In some embodiments, the access point address manager 106 may confirm that the updated E911 address has been stored (and thus can be made available to emergency services) before enabling Wi-Fi calling.

With reference now to FIG. 4B, an embodiment in which no street address has been associated with the access point 132 will be described. At (1), (2), and (3), as described above with reference to FIG. 4A, a mobile device 102 accesses a Wi-Fi network via an access point 132. An access point address manager 106 then obtains an identifier for the access point 132, and the access point address manager 106 queries an address data store 108 for a street address associated with the access point 132.

At (4'), in the embodiment depicted in FIG. 4B, the address data store 108 reports that it does not currently store any association between the access point 132 and a street address. Thereafter, at (5'), the access point address manager 106 instructs the mobile device 102 to obtain a street address to associate with the access point 132, and at (6') the mobile device 102 obtains the street address. In some embodiments, the mobile device 102 may obtain a street address by using a cellular telecommunications network and/or a satellite-based navigation system to obtain a geolocation (e.g., a latitude-longitude pair) of the mobile device 102, and then convert that geolocation to a street address using a mapping service. In other embodiments, the mobile device 102 may prompt a user to input a user-verified street address to associate with the access point 132 (e.g., by displaying a user interface such as the user interface 300 depicted in FIG. 3). In further embodiments, the mobile device 102 may obtain a street address that other mobile devices have associated with the access point 132.

At (7'), the mobile device 102 provides the obtained street address to the access point address manager 106, and at (8') the access point address manager 106 stores the obtained address and the associated access point 132 in the access point address data store 108. At (9'), (10'), and (11'), which correspond to the interactions at (5), (6), and (7) described above with reference to FIG. 4A, the access point address manager 106 provides the street address to an E911 address manager 122, which stores it in an E911 address data store 124. The access point address manager 106 then, in some embodiments, enables Wi-Fi calling on the mobile device 102.

It will be understood that FIGS. 4A and 4B are provided for purposes of example, and that the interactions depicted may be varied within the scope of the present disclosure. For example, the interactions at (8') and (9') may be carried out in any order relative to each other, or in parallel. As a further example, the interactions at (2), (3), and (4)/(4') may be carried out prior to the interaction at (1), and the access point address manager 106 may proactively cache street addresses for Wi-Fi networks that have been detected but not yet joined. FIG. 2 is thus understood to be illustrative and not limiting.

Figure 5:
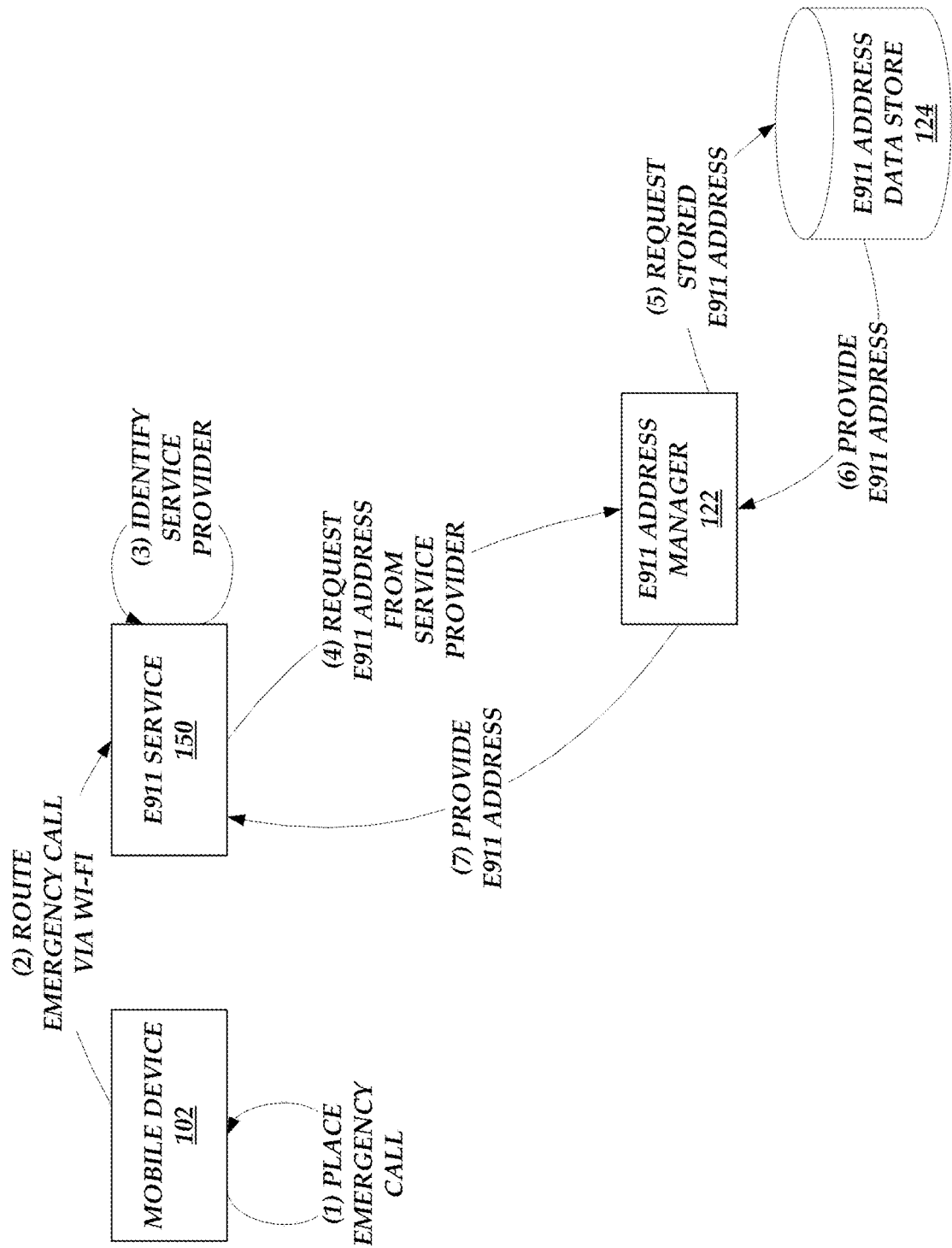
FIG. 5 is a block diagram depicting example interactions for providing an emergency services address to an emergency operator in accordance with aspects of the present disclosure.

FIG. 5 is a block diagram depicting example interactions for providing an E911 address to an emergency services operator in accordance with aspects of the present disclosure. At (1), a user of the mobile device 102 places an emergency call, and at (2) the mobile device 102 routes the emergency call to an E911 service 150 via a Wi-Fi network. In some embodiments, the mobile device 102 may be configured to route emergency calls via the cellular telecommunications network if possible. Such routing may be preferred since the cellular telecommunications network can generally provide more information regarding the location of the mobile device 102. However, the mobile device 102 may be in a location where the cellular network is unavailable but a Wi-Fi network is available, or may otherwise determine to route the emergency call via the Wi-Fi network.

At (3), the E911 service 150 determines that the mobile device 102 is associated with a particular cellular service provider. Thereafter, at (4), the E911 service 150 requests an E911 address from the cellular service provider's E911 address manager 122. As described above, the E911 address manager 122 may obtain and store a street address that is associated with the Wi-Fi access point used to route the emergency call. At (5), the E911 address manager 122 may request this stored address from the E911 address data store 124, which may return the stored address at (6). At (7), the E911 address manager 122 provides the mobile device's current E911 address to the E911 service 150, which may use it to identify and dispatch emergency services to the user.

In some embodiments, the E911 address manager 122 may attempt to locate the mobile device 102 via the cellular telecommunications network, and may only retrieve a stored E911 address if that attempt is unsuccessful. In other embodiments, the E911 address manager 122 may use the stored address to validate or refine location information obtained via the cellular telecommunications network. For example, the cellular telecommunications network may be able to confirm only that the mobile device is located somewhere within a geographic region (e.g., the coverage area of a particular base station), but may not be able to determine a more specific location. The E911 address manager 122 may thus retrieve the stored E911 address, confirm that it is within the geographic region, and then provide the stored E911 address to the emergency services operator in order to provide a more specific location for the mobile device 102.

Figure 6:
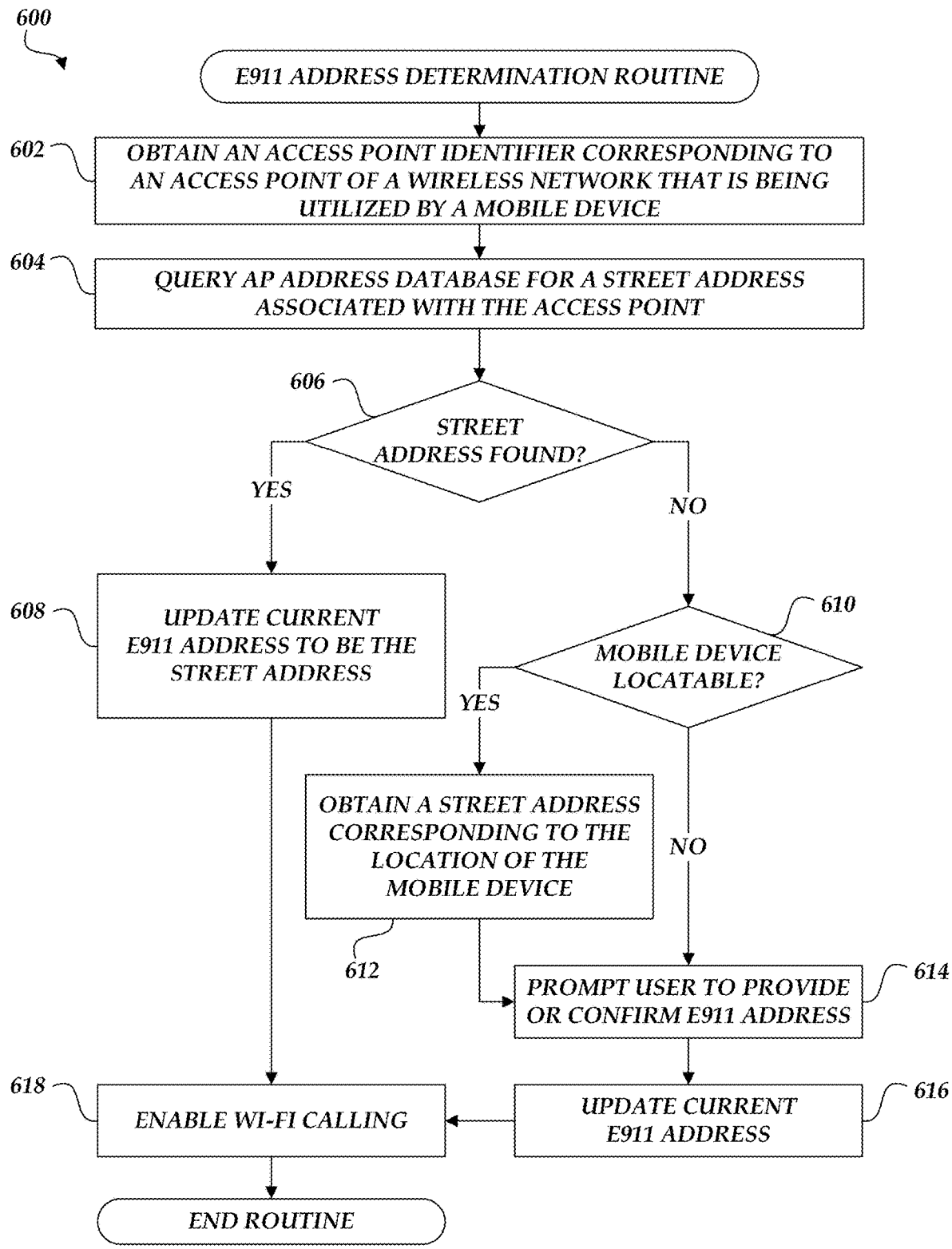
FIG. 6 is a flow diagram depicting an example emergency services address determination routine that may be implemented by an emergency services address management system in accordance with aspects of the present disclosure.

FIG. 6 is a flow diagram depicting an example E911 address determination routine 600. The routine 600 may be carried out, for example, by the access point address manager 106 depicted in FIG. 1. At block 602, an access point identifier may be obtained for an access point of a wireless network that is currently being used by a mobile device. As described above, the access point identifier may include a MAC address, SSID, IP address, or other information that identifies the access point. In some embodiments, the access point identifier may uniquely identify a particular access point. In other embodiments, the access point identifier may correspond to more than one access point.

At block 604, an access point address database, such as the access point address data store 108 depicted in FIG. 1, is queried for a street address associated with the identified access point. At decision block 606, a determination is made as to whether an associated street address is available. Illustratively, the determination may be as to whether the database contains a valid and up-to-date address that is associated with the access point. In some embodiments, as described above, the stored address may be compared to other location data to determine whether the stored address remains accurate, and the determination at decision block 606 may be as to whether the stored address exists and can be verified. If the determination at decision block 606 is that a valid street address for the access point has been found, then the routine 600 branches to block 608, where the current E911 address for the mobile device is updated to be the obtained street address. The routine 600 then continues at block 618, where Wi-Fi calling is enabled for the mobile device.

However, if the determination at decision block 606 is that the database does not include a street address associated with the access point, then at decision block 610 a determination is made as to whether location data can be obtained for the mobile device. In various embodiments, as described above, location data may be obtained by querying a geolocation service on the mobile device, requesting the location of the device from a cellular telecommunications network, determining the locations of other nearby devices (e.g., by communicating with nearby devices via Wi-Fi or Bluetooth, or by requesting that the cellular telecommunications network locate other devices on the Wi-Fi network), or obtaining historical locations associated with the access point (e.g., by querying a central data store maintained by the cellular service provider). If location data can be obtained from any of the above sources, then at block 612 the location data is converted into a street address, which the user is then prompted to confirm at block 614. In some embodiments, blocks 610 and 612 may be combined, and the determination may be as to whether a street address can be obtained from historical data. If the determination at decision block 610 is that the mobile device cannot be located automatically, then at block 614 the user is prompted to provide an E911 address. In some embodiments, as discussed above, the user may be presented with the option of inputting an E911 address regardless of whether the routine 600 is able to locate the mobile device. Thereafter, at block 616, the E911 address is updated to be the street address that was entered or confirmed by the user at block 614. The routine 600 then continues to block 618, where Wi-Fi calling is enabled.

In various embodiments, the blocks of routine 600 may be combined, omitted, or carried out in various orders. For example, decision block 610 may be carried out prior to block 604, and the routine 600 may default to determining a location of the mobile device via the cellular network if possible. As a further example, block 618 may be omitted and Wi-Fi calling may be enabled regardless of whether the access point can be associated with a street address. The routine 600 is thus understood to be illustrative and not limiting.

Figure 7:
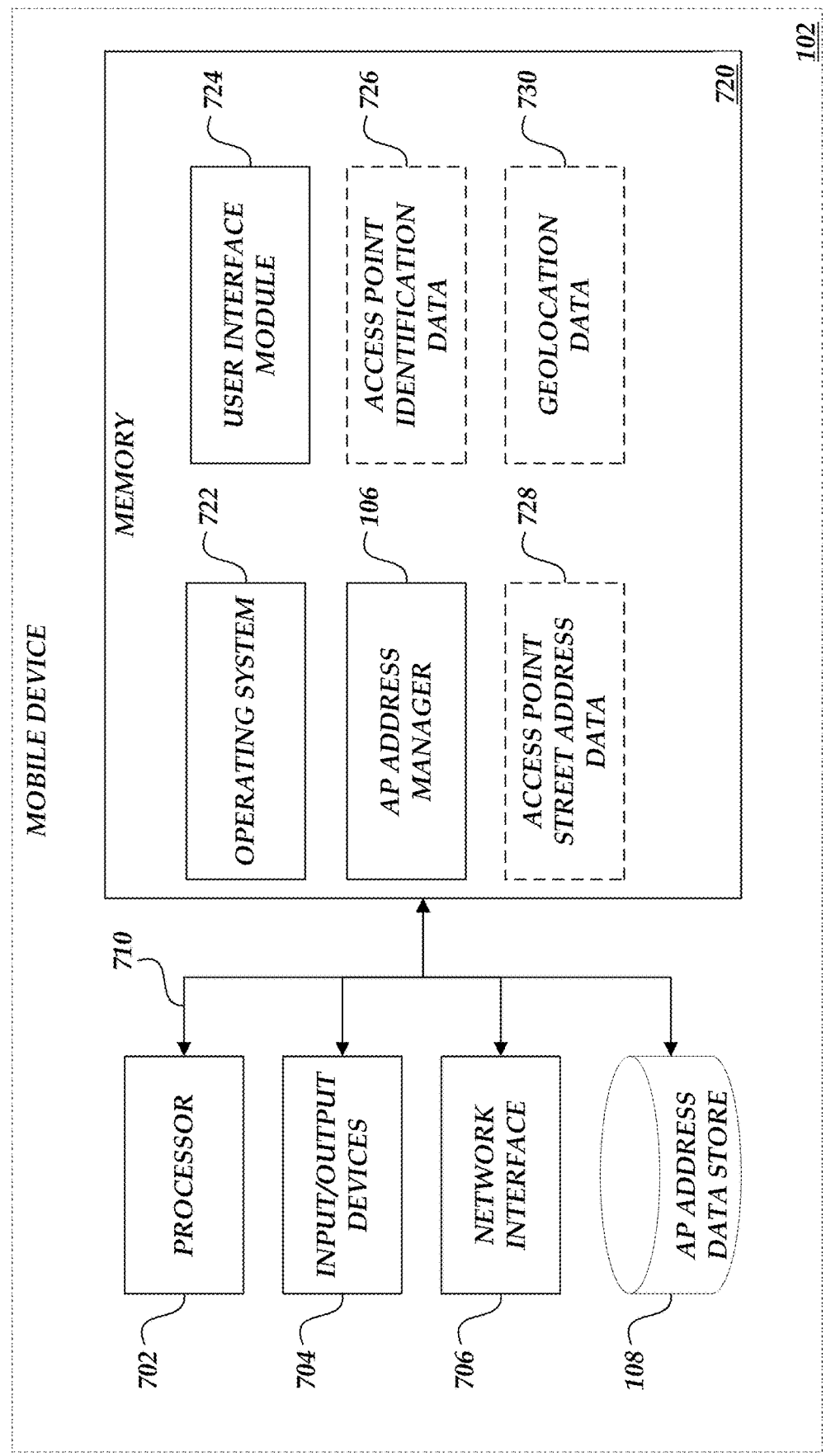
FIG. 7 is a functional block diagram of an example mobile device for implementing an emergency services address management system in the network environment of FIG. 1.

FIG. 7 is an illustrative block diagram depicting a general architecture of a mobile device 102, which includes an arrangement of computer hardware and software that may be used to implement aspects of the present disclosure. The mobile device 102 may include more (or fewer) elements than those displayed in FIG. 7. It is not necessary, however, that all of these elements be shown in order to provide an enabling disclosure.

As illustrated, the mobile device 102 includes a processor 702, input/output devices 704, a network interface 706, and an access point address data store 108, all of which may communicate with one another by way of a communication bus 710. The network interface 706 may provide connectivity to one or more networks (such as the networks 110 and 130A-C of FIG. 1) or computing systems and, as a result, may enable the mobile device 102 to receive and send information and instructions from and to other computing systems or services.

The processor 702 may also communicate to and from a memory 720. The memory 720 may contain computer program instructions (grouped as modules or components in some embodiments) that the processor 702 may execute in order to implement one or more embodiments. The memory 720 generally includes RAM, ROM, and/or other persistent, auxiliary, or non-transitory computer-readable media. The memory 720 may store an operating system 722 that provides computer program instructions for use by the processor 702 in the general administration and operation of the mobile device 102. The memory 720 may further store specific computer-executable instructions and other information (which may be referred to herein as "modules") for implementing aspects of the present disclosure.

In some embodiments, the memory 720 may include a user interface module 724, which may be executed by the processor 702 to perform various operations, such as generating the user interface described with reference to FIG. 3 above. The memory 720 may further include an access point address manager 106, which may obtain and determine addresses of access points and store them in the access point address data store 108. The memory 720 may still further include access point identification data, access point street address data, and geolocation data that are collected via the network interface 706 (or, in some embodiments, obtained from the access point address data store 108) and loaded into the memory 720 as various operations are performed.

While the operating system 722, user interface module 724, and access point address manager 106 are illustrated as distinct modules in the memory 720, in some embodiments, the user interface module 724 and the access point address manager 106 may be incorporated as modules in the operating system 722 or another application or module, and as such, separate modules may not be required to implement some embodiments. In some embodiments, the user interface module 724 and access point address manager 106 may be implemented as parts of a single application.

It will be recognized that many of the components described in FIG. 7 are optional and that embodiments of the mobile device 102 may or may not combine components. Furthermore, components need not be distinct or discrete. Components may also be reorganized. For example, the mobile device 102 may be represented in a single physical device or, alternatively, may be split into multiple physical devices. In some embodiments, components illustrated as part of the mobile device 102 may additionally or alternatively be included in other computing devices, such that some aspects of the present disclosure may be performed by the mobile device 102 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:
1. A mobile computing device comprising:
  a data store configured to store associations between wireless networks and E911 addresses;
  a memory configured to store computer-executable instructions; and a processor in communication with the memory, wherein the computer-executable instructions, when executed by the processor, configure the processor to perform operations including:
  obtaining an access point identifier, wherein the access point identifier corresponds to an access point of a first wireless network;
  determining whether the data store includes an association between the access point identifier and an E911 address;
  responsive to a determination that the data store does not include an association between the access point identifier and an E911 address:
    obtaining a geophysical location of the mobile computing device;
    obtaining a street address corresponding to the geophysical location;
    generating a user interface, wherein the user interface prompts a user to confirm that the street address corresponding to the geophysical location should be used as an E911 address for emergency calls made via the first wireless network, or to input an alternate street address via the user interface;
    causing display of the user interface on the mobile computing device;
    obtaining, via the user interface, user input identifying a user-verified street address to use as the E911 address for emergency calls made via the first wireless network; and
    causing an E911 address database associated with a public safety access point to store the user-verified street address as a current E911 address for the mobile computing device; and
  enabling voice communication via the first wireless network.

2. The mobile computing device of claim 1, wherein the user-verified street address comprises the street address corresponding to the geophysical location.

3. The mobile computing device of claim 1, wherein the user-verified street address comprises a street address that is input via the user interface.

4. The mobile computing device of claim 1, wherein the first wireless network comprises a Wi-Fi network.

5. The mobile computing device of claim 1, wherein the geophysical location of the mobile computing device is obtained via a second wireless network.

6. A computer-implemented method comprising:
  obtaining, by a mobile computing device, a first access point identifier associated with a first access point of a first wireless network;
  determining, by the mobile computing device, that an E911 address corresponding to the first access point identifier is not available;
  generating, by the mobile computing device, a user interface, wherein the user interface prompts a user to confirm that a street address corresponding to a geophysical location of the mobile computing device should be used as an E911 address for emergency calls made via the first wireless network, or to input an alternate street address via the user interface;
  obtaining via the user interface, by the mobile computing device, a first street address associated with the first access point identifier;
  causing an E911 address database associated with a public safety access point to store the first street address associated with the first access point identifier as a current E911 address for the mobile computing device; and
  enabling voice communication via the first wireless network.

7. The computer-implemented method of claim 6, wherein obtaining the first street address associated with the first access point identifier comprises obtaining confirmation that the street address corresponding to the geophysical location of the mobile computing device should be used via the user interface on the mobile computing device.

8. The computer-implemented method of claim 6, wherein the first street address is obtained via the user interface on the mobile computing device in response to a determination that the first street address cannot be obtained via a second wireless network.

9. The computer-implemented method of claim 8, wherein the second wireless network comprises one or more of a cellular telecommunications network or a satellite-based geolocation system.

10. The computer-implemented method of claim 6, wherein obtaining the first street address associated with the first access point identifier comprises determining the first street address based at least in part on information obtained from other mobile computing devices associated with the first access point.

11. The computer-implemented method of claim 6, wherein the first street address associated with the first access point is obtained from the first access point.

12. The computer-implemented method of claim 6, wherein the first access point identifier comprises one or more of a Media Access Control address ("MAC address"), Internet Protocol address ("IP address"), or Service Set Identifier ("SS ID").

13. The computer-implemented method of claim 6, wherein determining that an E911 address corresponding to the first access point identifier is not available comprises:
  querying, by the mobile computing device, an access point data base; and
  obtaining no results from the query.

14. The computer-implemented method of claim 6 further comprising:
  determining that the mobile computing device is no longer communicating with the first access point; and
  causing the E911 address database associated with the public safety access point to store a default E911 address as the current E911 address for the mobile computing device.

15. The computer-implemented method of claim 14 further comprising:
  obtaining, by the mobile computing device, a second access point identifier associated with a second access point of a second wireless network;
  determining, by the mobile computing device, that an E911 address corresponding to the second access point identifier is available; and
  causing the E911 address database associated with the public safety access point to store the E911 address corresponding to the second access point identifier as the current E911 address for the mobile computing device.

16. The computer-implemented method of claim 15, wherein determining that the E911 address corresponding to the second access point identifier is available comprises obtaining a result from a query of an access point database.

17. A non-transitory computer-readable medium storing computer-executable instructions that, when executed by a processor, configure the processor to:
- in response to a determination that no street address is associated with a first access point of a first wireless network, generate a user interface that prompts a user of a first mobile computing device to confirm or input a street address to associate with the first access point;
- obtain a first street address via the user interface and associate the first street address with the first access point;
- cause an E911 address database associated with a public safety access point to store the first street address as a current E911 address of the first mobile computing device; and
- enable voice communication via the first wireless network on the first mobile computing device.

18. The non-transitory computer-readable medium of claim 17 storing further computer-executable instructions that, when executed by the processor, configure the processor to cause the E911 address database associated with the public safety access point to store the first street address in response to an emergency call placed via the first mobile computing device.

19. The non-transitory computer-readable medium of claim 17 storing further computer-executable instructions that, when executed by the processor, configure the processor to store the association between the first street address and the first access point.

20. The non-transitory computer-readable medium of claim 19 storing further computer-executable instructions that, when executed by the processor, configure the processor to:
- determine that a second mobile computing device has joined the first wireless network via the first access point; and
- cause the E911 address database associated with the public safety access point to store the first street address as a current E911 address of the second mobile computing device.

* * * * *